(12) United States Patent
Song et al.

(10) Patent No.: US 10,168,981 B2
(45) Date of Patent: Jan. 1, 2019

(54) METHOD FOR SHARING IMAGES AND ELECTRONIC DEVICE PERFORMING THEREOF

(71) Applicant: Samsung Electronics Co., Ltd., Suwon-si, Gyeonggi-do (KR)

(72) Inventors: Woo Taek Song, Suwon-si (KR); Tae Kyung Lee, Seoul (KR); Dong Il Son, Hwaseong-si (KR); Chi Hyun Cho, Suwon-si (KR); Jong Chul Choi, Suwon-si (KR); Chang Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 15/179,487

(22) Filed: Jun. 10, 2016

(65) Prior Publication Data
US 2016/0364198 A1    Dec. 15, 2016

(30) Foreign Application Priority Data
Jun. 11, 2015   (KR) .................. 10-2015-0082414

(51) Int. Cl.
*G06F 3/14* (2006.01)
*G06F 3/01* (2006.01)
*G09G 5/12* (2006.01)
*G02B 27/01* (2006.01)

(52) U.S. Cl.
CPC ......... *G06F 3/1454* (2013.01); *G02B 27/017* (2013.01); *G06F 3/012* (2013.01); *G06F 3/017* (2013.01); *G09G 5/12* (2013.01); *G02B 2027/014* (2013.01); *G02B 2027/0132* (2013.01); *G02B 2027/0187* (2013.01); *G09G 2370/02* (2013.01)

(58) Field of Classification Search
CPC ...... G06G 3/1454; G06G 3/012; G06G 3/017; G09G 5/12; G09G 2370/22; G02B 2027/0187
See application file for complete search history.

(56) References Cited

U.S. PATENT DOCUMENTS

| | | | |
|---|---|---|---|
| 7,367,809 B2 | 5/2008 | Takahashi | |
| 8,834,303 B2 | 9/2014 | Jennings | |
| 9,066,200 B1 | 6/2015 | Loxam et al. | |
| 9,338,589 B2 | 5/2016 | Loxam et al. | |
| 2007/0184422 A1 | 8/2007 | Takahashi | |
| 2008/0252637 A1 | 10/2008 | Berndt et al. | |
| 2009/0189890 A1* | 7/2009 | Corbett | G06F 9/505 345/419 |
| 2011/0200297 A1* | 8/2011 | Oh | H04N 9/8227 386/230 |

(Continued)

*Primary Examiner* — Liliana Cerullo
(74) *Attorney, Agent, or Firm* — Jefferson IP Law, LLP

(57) ABSTRACT

An electronic device for a head-mounted device (HMD) is provided. The electronic device includes a display, a memory configured to store virtual reality content, a processor configured to play back binocular image data based on the virtual reality content on the display, and a communication circuit configured to communicate with an external device. At this time, the processor is configured to determine whether the virtual reality content is stored in the external device and to determine data to be transmitted to the external device based on the determined result.

11 Claims, 17 Drawing Sheets

(56) References Cited

U.S. PATENT DOCUMENTS

| | | |
|---|---|---|
| 2014/0100006 A1 | 4/2014 | Jennings |
| 2014/0253743 A1 | 9/2014 | Loxam et al. |
| 2016/0093108 A1* | 3/2016 | Mao ........................ A63F 13/42 |
| | | 345/633 |

* cited by examiner

METHOD FOR SHARING IMAGES AND ELECTRONIC DEVICE PERFORMING THEREOF

CROSS-REFERENCE TO RELATED APPLICATION(S)

This application claims the benefit under 35 U.S.C. § 119(a) of a Korean patent application filed on Jun. 11, 2015 in the Korean Intellectual Property Office and assigned Serial number 10-2015-0082414, the entire disclosure of which is hereby incorporated by reference.

TECHNICAL FIELD

The present disclosure relates to an electronic device connected to a head-mounted device (HMD) and an image sharing method performed by the electronic device.

BACKGROUND

In recent, various electronic devices that are directly worn on a body are being developed. Generally, the devices are referred to as "wearable electronic devices". For example, the wearable electronic device includes a head-mounted display (HMD), a smart glass, a smart watch, a wristband, a contact lens-shaped device, a ring-shaped device, shoe type devices, a wearable device, a glove-shaped device, and the like. The wearable electronic device is directly worn on a body or clothes, thereby significantly improving portability and accessibility of a user.

An HMD, which is mounted on the head of a user, from among various embodiments of the wearable electronic device provides a specific image that is displayed at a point adjacent to both eyes of a user, providing a realistic image to the user.

Generally, while being spaced apart from a user by a specific distance, a television (TV) or a display device provides an image, and thus a plurality of users watch the same image through the TV or the display device at the same time. However, an HMD is mounted on the head of the user and only provides image content to the user. Accordingly, two or more users do not share the same image content.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image sharing method that determines data to be transmitted based on whether an external device sharing image content includes virtual reality content to be shared and/or based on a type of the external device and an electronic device performing the method.

In accordance with an aspect of the present disclosure, an electronic device for a head-mounted device (HMD) is provided. The electronic device includes a display, a memory configured to store virtual reality content, a processor configured to play back binocular image data based on the virtual reality content on the display, and a communication circuit configured to communicate with an external device. At this time, the processor is configured to determine whether the virtual reality content is stored in the external device and to determine data to be transmitted to the external device based on the determined result.

In accordance with another aspect of the present disclosure, an image sharing method of an electronic device that plays back binocular image data based on virtual reality content is provided. The image sharing method includes establishing a connection with an external device, determining whether the virtual reality content is stored in the external device, determining data, which is shared with the external device, based on the determination result, and transmitting the determined data to the external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
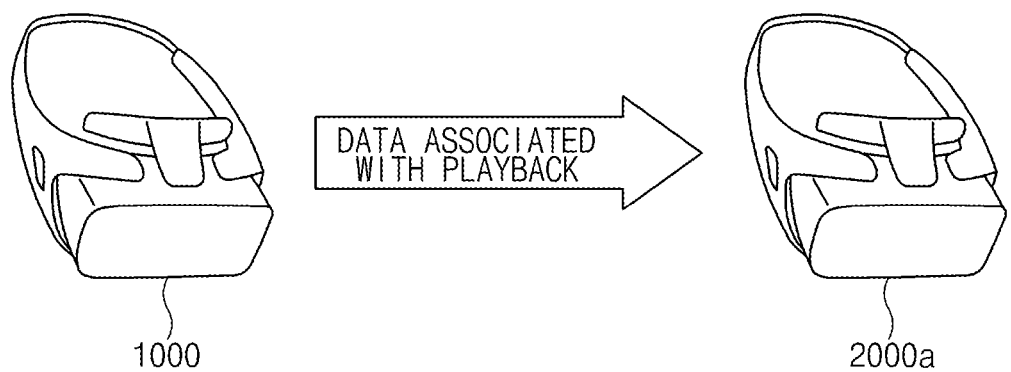
FIGS. 1A to 1D are diagrams for describing an image sharing method according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions "include" and "comprise" or "may include" and "may comprise" used in the various embodiments of the present disclosure indicate existence of corresponding features, operations, or elements disclosed herein but do not exclude additional one or more functions, operations, or elements. It will be further understood that the terms "comprises," "comprising," "includes," and/or "including," when used in the various embodiments of the present disclosure, specify the presence of stated features, numbers, steps, operations, elements, components, or groups thereof, but do not preclude the presence or addition of one or more other features, numbers, steps, operations, elements, components, and/or groups thereof.

In the various embodiments of the present disclosure, the expressions of "or", "at least one of A or/and B", or the like may include one or all combinations of the associated listed words. For example, the term "A or B" or "at least one of A and/or B" may refer to all of the case (1) where 'A' is included, the case (2) where 'B' is included, or the case (3) where both of 'A' and 'B' are included.

The terms, such as "first", "second", and the like used in the various embodiments of the present disclosure may refer to various elements of various embodiments, but do not limit the elements. For example, the terms may not limit the order and/or the importance of the elements. Furthermore, such terms may be used to distinguish one element from another element. For example, "a first user device" and "a second user device" may indicate all user devices and may indicate different user devices. For example, without departing the scope according to various embodiments of the present disclosure, a first element may be referred to as a second element, and similarly, a second element may be referred to as a first element.

It will be understood that when an element is referred to as being "connected" or "coupled" to the other element, the element can be directly connected or coupled to the other element or another new elements may be present between the element and the other element. In contrast, when an element is referred to as being "directly connected" or "directly coupled" to another element, there are no another new elements between the element and the other element.

Unless otherwise defined, all terms (including technical and scientific terms) used herein are to be interpreted as is customary in the art to which the various embodiments of the present disclosure belongs. It will be understood that terms used herein should be interpreted as having a meaning that is consistent with their meaning in the context of this disclosure and the relevant art and will not be interpreted in an idealized or overly formal sense unless expressly so defined in the various embodiments of the present disclosure.

An electronic device according to the various embodiments of the present disclosure may be a device that includes a communication function. For example, an electronic device may include at least one of smartphones, tablet personal computers (PCs), mobile phones, video telephones, electronic book readers, desktop PCs, laptop PCs, netbook computers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, wearable devices (e.g., head-mounted-devices (HMDs), such as electronic glasses, an electronic apparel, electronic bracelets, electronic necklaces, electronic appcessories, electronic tattoos, smart watches), or the like.

According to various embodiments of the present disclosure, the electronic devices may be smart home appliances having a communication function. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames, or the like.

According to various embodiments of the present disclosure, the electronic devices may include at least one of various medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs) of financial institutions, or points of sales (POSs).

According to the various embodiments of the present disclosure, the electronic device may be one of the above-described various devices or a combination thereof. An electronic device according to the various embodiments of the present disclosure may be a flexible device. Furthermore, an electronic device according to the various embodiments of the present disclosure may not be limited to the above-described devices.

Hereinafter, an electronic device according to the various embodiments will be described with reference to the accompanying drawings. The term "user" used in the various embodiments may refer to a person who uses an electronic device or may refer to a device (e.g., an artificial intelligence electronic device) that uses an electronic device.

According to an embodiment of the present disclosure, "head-mounted display" may mean a device combining an electronic device (e.g., smartphone) that plays back image data based on two dimensional (2D) content or virtual reality content, and a structure (hereinafter, head-mounted device) that makes contact with an area around both eyes of the user. According to an embodiment, the head-mounted display may be a device, as one body, generated by combining the electronic device and the head-mounted device. However, according to an embodiment of the present disclosure, it is described that the head-mounted display is a device generated by combining an electronic device and a head-mounted device each of which is separately implemented.

According to an embodiment of the present disclosure, "virtual reality content" may correspond to content that makes it possible to realistically provide various events, which occur in cyberspace, to a user. On the basis of virtual reality content according to an embodiment, a user may select one view point among a plurality of view-points in three dimensional (3D) cyberspace, receiving an image (e.g., stereoscopic image data) according to the selected view point. At this time, even though images that will be provided to a user are in the same cyberspace and in the same playback view point, the images may be different from each other based on each view point.

According to an embodiment of the present disclosure, "binocular image data" may mean data for stereoscopically providing a user with a stereoscopic image according to the virtual reality content. The binocular image data according to an embodiment may correspond to a pair of 2D image data having a binocular parallax (e.g., a left-eye image screen 701L and a right-eye image screen 701R in FIG. 7). On the basis of a binocular parallax, a user may watch a stereoscopic image having a three-dimensional effect (i.e., stereoscopic effect) through a pair of 2D image data.

Figure 9:
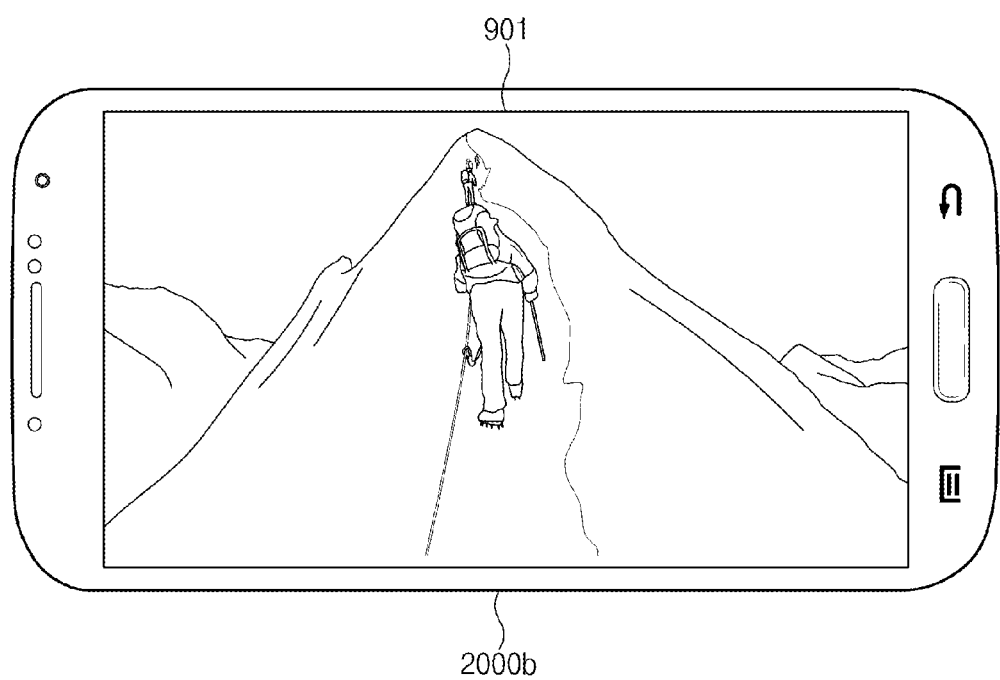
FIG. 9 is a diagram for describing a mono image outputted from an external device by an image sharing method according to an embodiment of the present disclosure.

According to an embodiment of the present disclosure, "mono image data" may correspond to data about a mono image outputted from a general display device (refer to a mono image screen 901 of FIG. 9). The mono image data may be generated based on the virtual reality content.

FIGS. 1A to 1D are diagrams for describing an image sharing method according to various embodiments of the present disclosure.

Image sharing methods according to various embodiments of the present disclosure may be different based on whether to include virtual reality content, which corresponds to (i.e., is equal to) content stored in a device sharing an image, in the device sharing an image and/or whether a device sharing the image is a head-mounted display (i.e., a device sharing the image is connected to a head-mounted display).

Referring to FIG. 1A, an image sharing method according to an embodiment of the present disclosure may be performed between a head-mounted display 1000 and a head-mounted display 2000a. Each of the head-mounted display 1000 and the head-mounted display 2000a may store the same virtual reality content and may provide a user corresponding to each device with a stereoscopic image based on virtual reality content.

According to an embodiment of the present disclosure, the head-mounted display 1000 may transmit data associated with playback of image data based on the virtual reality content. The data associated with playback (hereinafter referred to as "data associated with playback") may include a playback time (i.e., playback timing) of image data based on the virtual reality content, location data in cyberspace according to the playback time, user sensing data (e.g., head tracking data) based on the motion of a user, and the like. Because the same virtual reality content as virtual reality content stored in the head-mounted display 1000 is stored in the head-mounted display 2000a, the head-mounted display 2000a may provide a corresponding user with an image corresponding to (e.g., being equal to) an image, which is being played back at the head-mounted display 1000 based on data associated with playback received from the head-mounted display 1000.

Figure 1B:
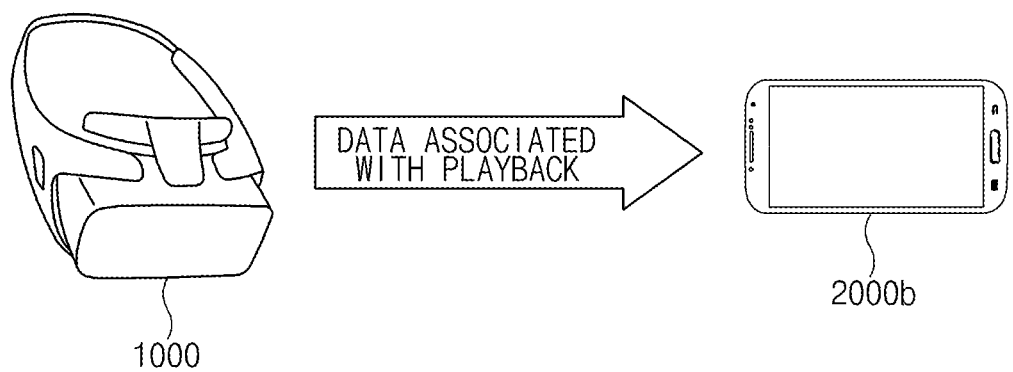

Referring to FIG. 1B, an image sharing method according to an embodiment of the present disclosure may be performed between the head-mounted display 1000 and an electronic device (e.g., smartphone) 2000b. Each of the head-mounted display 1000 and the electronic device 2000b may store the same virtual reality content. Because the electronic device 2000b is not connected with a head-mounted device, the electronic device 2000b may provide a corresponding user with a mono image based on virtual reality content.

According to an embodiment of the present disclosure, the head-mounted display 1000 may transmit data associated with playback of image data based on the virtual reality content. Because the same virtual reality content as virtual reality content stored in the head-mounted display 1000 is stored in the electronic device 2000b, the electronic device 2000b may provide a corresponding user with a mono image corresponding to an image, which is played back in the head-mounted display 1000 based on data associated with playback received from the head-mounted display 1000.

Figure 1C:
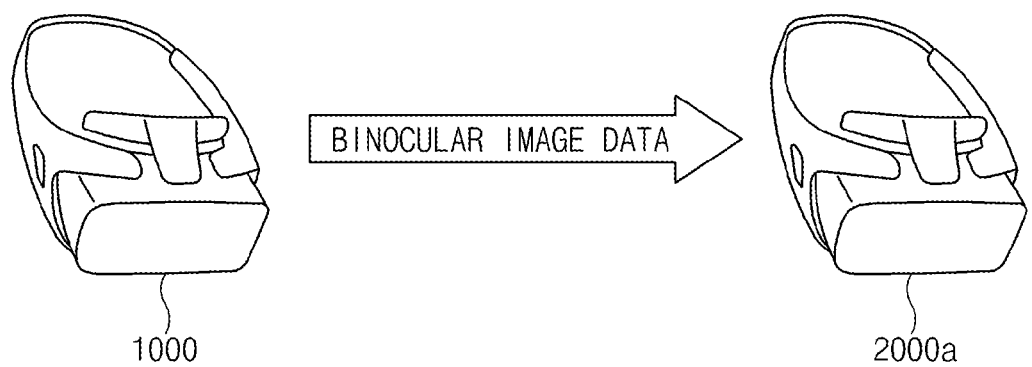

Referring to FIG. 1C, an image sharing method according to an embodiment of the present disclosure may be performed between a head-mounted display 1000 and a head-mounted display 2000a. Unlike an embodiment in FIG. 1A, in FIG. 1C, the same virtual reality content as that of the head-mounted display 1000 may not be stored in the head-mounted display 2000a.

According to an embodiment of the present disclosure, the head-mounted display 1000 may generate and transmit binocular image data based on the virtual reality content. The binocular image data may correspond to (or is equal to) binocular image data outputted from the head-mounted display 1000. Because virtual reality content stored in the head-mounted display 1000 is not stored in the head-mounted display 2000a, the head-mounted display 2000a may provide a corresponding user with an image according to the binocular image data received from the head-mounted display 1000.

Figure 1D:
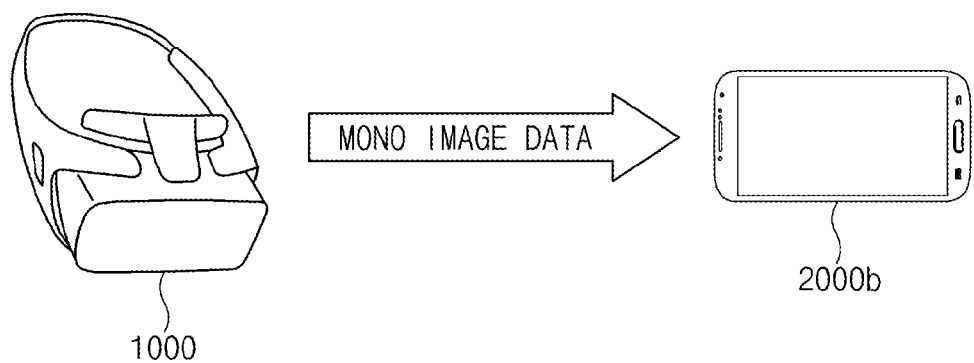

Referring to FIG. 1D, an image sharing method according to an embodiment of the present disclosure may be performed between the head-mounted display 1000 and the electronic device 2000b. Unlike an embodiment in FIG. 1B, in FIG. 1D, the same virtual reality content as that of the head-mounted display 1000 may not be stored in the electronic device 2000b.

According to an embodiment of the present disclosure, the head-mounted display 1000 may generate and transmit mono image data based on the virtual reality content. The mono image data may be image data corresponding to binocular image data outputted from the head-mounted display 1000. Because the same content as virtual reality content stored in the head-mounted display 1000 is not stored in the electronic device 2000b, the electronic device 2000b may provide a corresponding user with an image according to a mono image data received from the head-mounted display 1000.

Below, elements of a head-mounted display, a head-mounted device, and an electronic device according to an embodiment of the present disclosure will be described, and an image sharing method according to various embodiments of the present disclosure will be described.

Figure 2:
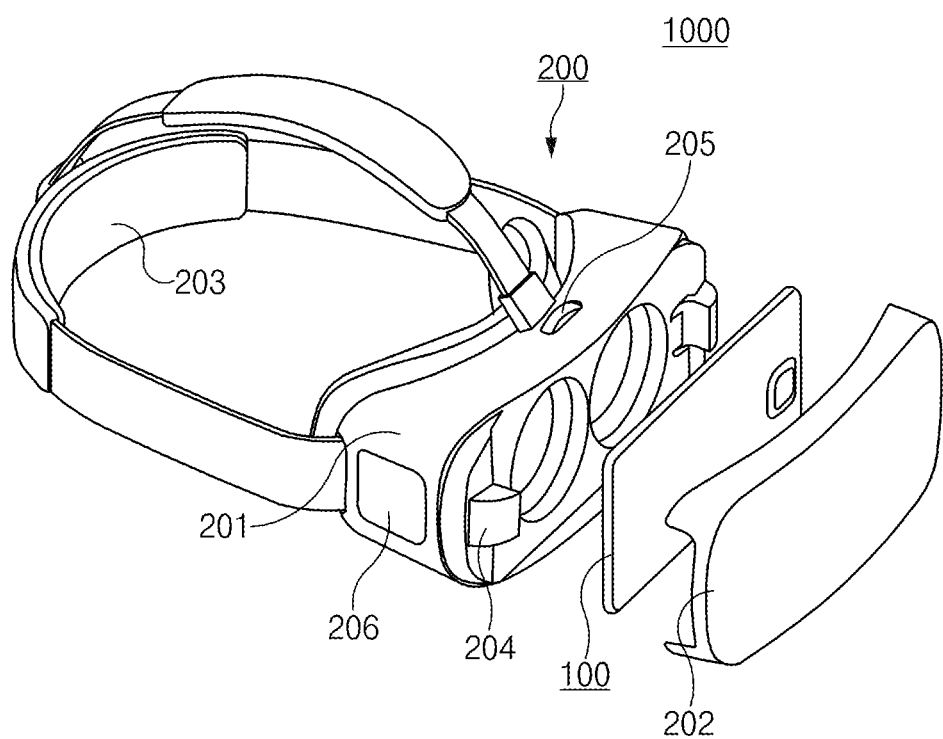
FIG. 2 is an exploded perspective view illustrating a head-mounted display according to an embodiment of the present disclosure.

FIG. 2 is an exploded perspective view illustrating a head-mounted display according to an embodiment of the present disclosure.

Referring to FIG. 2, the head-mounted display 1000 according to an embodiment of the present disclosure may include an electronic device 100 (e.g., smartphone) and a head-mounted display 200. Descriptions about the electronic device 100 will be described with reference to FIG. 4. The head-mounted device 200 may outwardly include a main frame 201, a cover 202, and a mounting member 203.

A space for containing the electronic device 100 may be formed in the main frame 201. The main frame 201 may outwardly include a connector 204, a display location adjustment unit 205, and an input unit 206. According to an embodiment, an element (e.g., lens adjustment unit) that is not shown may be included in the main frame 201.

The connector 204 may be combined with a connection part (e.g., universal serial bus (USB) interface) of the electronic device 100. The head-mounted device 200 and the electronic device 100 may interact with each other by the combination.

The display location adjustment unit 205 may be an element for moving to a position suitable for a user to watch the display of the electronic device 100. The display location adjustment unit 205 may be implemented with hardware or software. A plurality of the display location adjustment unit 205 may be arranged on an external surface of the main frame 201.

The input unit 206 may be a user interface, and a user may control a graphical user interface (GUI) of the electronic device 100 through the input unit 206. The input unit 206 may be provided on the side of the main frame 201, and the input unit 206 may correspond to a touch pad that receives a touch input (e.g., input through a direct touch or hovering input).

An input through the input unit 206 may be transmitted to the electronic device 100, and the electronic device 100 may provide a corresponding function in response to the input. For example, a user may input a touch input to a touch pad to adjust a sound of content or to control an image playback. A plurality of the input unit 206 may be arranged on the main frame 201. The input unit 206, for example, may include a physical button, a touch key, a joystick, and a wheel key.

The cover 202 may be fixed on the main frame 201 and may cover a space in which the electronic device 100 is contained.

The mounting member 203 may be coupled to the main frame 201 and may fix the head-mounted device 200 on a part of a body (e.g., head) of a human. For example, the mounting member 203 may include a band, a velcro tape, and the like that are formed of an elastic material. The main frame 201 may adhere to an area of a user's head around the eyes of the user by the mounting member 203. According to another embodiment, the mounting member 203 may be implemented with eyeglass temples, a helmet, straps, or the like.

Figure 3:
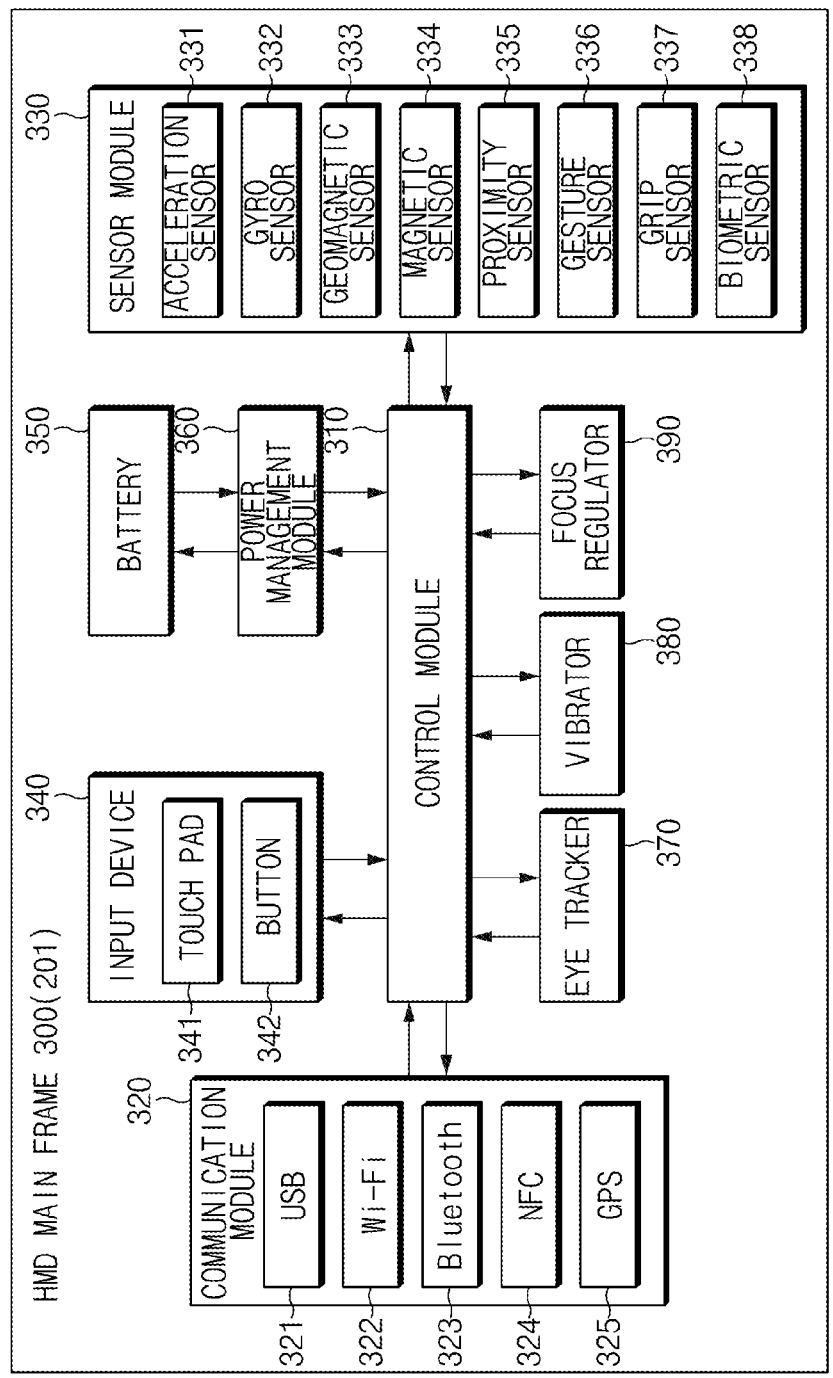
FIG. 3 is a block diagram illustrating a main frame of a head-mounted device according to an embodiment of the present disclosure.

FIG. 3 is a block diagram illustrating a main frame of a head-mounted device according to an embodiment of the present disclosure.

Referring to FIG. 3, the main frame 300 (e.g., main frame 201 of FIG. 2) of the head-mounted device 200 may include a control module 310, a communication circuit 320, a sensor module 330, an input device 340, a battery 350, a power management module 360, an eye tracker 370, a vibrator 380, and a focus regulator (or lens assembly) 390. According to an embodiment, a part of elements in the main frame 201 illustrated in FIG. 3 may be included in the electronic device 100.

For example, the control module 310 may include a processor or a micro controller unit (MCU). The control module 310 may drive an operating system (OS) or an embedded software (S/W) program, and thus the control module 310 may control the functions of a plurality of elements connected to the control module 310.

The communication circuit 320 may connect the main frame 201 and the electronic device 100 through a wired and/or wireless communication network. The communication circuit 320 may relay data between the main frame 201 and the electronic device 100. According to an embodiment, the communication circuit 320 may include a USB module 321 (e.g., connector 204 of FIG. 2), a Wi-Fi module 322, a Bluetooth module 323, a near field communication (NFC) module 324, and a GPS module 325. According to an embodiment, at least one (e.g., two or more elements) of the Wi-Fi module 322, the Bluetooth module 323, the NFC module 324, and the GPS module 325 may be included in one integrated circuit (IC) or an IC package.

The sensor module 330 may measure a physical quantity or may detect an operating state of the head-mounted device 200. The sensor module 330 may convert the measured or detected information into an electric signal. For example, the sensor module 330 may include at least one of an acceleration sensor 331, a gyro sensor 332, a geomagnetic sensor 333, a magnetic sensor 334, a proximity sensor 335, a gesture sensor 336, a grip sensor 337, or a biometric sensor 338.

For example, the acceleration sensor 331, the gyro sensor 332, and the geomagnetic sensor 333 may detect the motion (i.e., head tracking) of the head of user that wears the head-mounted device 200. Moreover, the proximity sensor 335 or the grip sensor 337 may detect whether to wear the head-mounted device 200. Whether a user wears the head-mounted device 200 may be detected through an infrared recognition, a pressurization recognition, or a recognition of a change of a capacitance (or permittivity). The gesture sensor 336 may detect the motion of the hand or finger of a user and may convert the detected result into a user input signal. The biometric sensor 338 may include, for example, an E-nose sensor, an electromyography sensor (EMG) sensor, an electroencephalogram (EEG) sensor, an electrocardiogram (ECG) sensor, an iris sensor, or the like.

According to an embodiment of the present disclosure, the sensor module 330 may further include a control circuit that controls various sensors. At least some of the sensor module 330 may be included in the electronic device 100 mounted in the head-mounted device 200.

The input device 340 (e.g., input unit 206 of FIG. 2) may include a touch pad 341, a physical button 342, and the like. The touch pad may sense (or receive) a touch input based on at least one of capacitive, resistive, infrared and ultrasonic detecting methods. Moreover, the touch pad may further include a control circuit. In the case of a capacitive detecting method, a physical contact or proximity recognition may be possible. The touch pad may further include a tactile layer. In this case, the touch pad may provide a tactile reaction to a user. The button may include, for example, a physical button, an optical key, or a keypad.

The battery 350 may power each element of the head-mounted device 200. The battery 350 may control a power supply to each element of the head-mounted device 200 through the power management module 360. The battery 350 may be included in a battery embedded in the electronic device 100 and may be independently included in the head-mounted device 200.

For example, the eye tracker 370 may track the eye of a user based on at least one of an electrical oculography (EOG) sensor method, a coil systems method, a dual purkinje systems method, a bright pupil systems method, or a dark pupil systems method. Moreover, the eye tracker 370 may further include a micro camera tracking the eye of a user.

The focus regulator 390 may measure the inter-pupil distance (IPD) of a user to adjust the distance between a left-lens and a right-lens, and the position of the display of a smartphone based on the IPD, which allow a user to watch an image that is suitable for a physical condition of the user.

Figure 4:
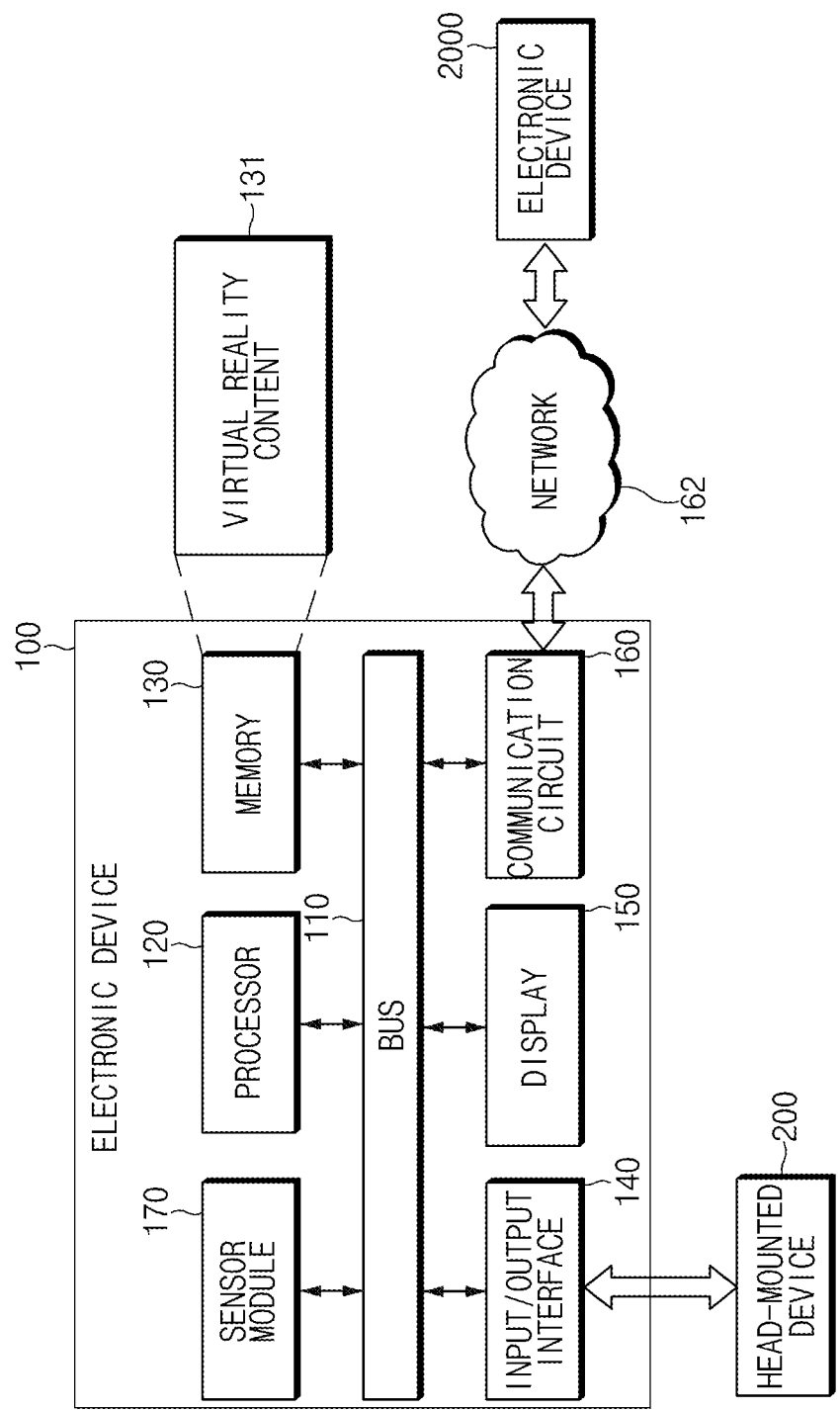
FIG. 4 is a block diagram illustrating an electronic device according to an embodiment of the present disclosure.

FIG. 4 is a block diagram illustrating an electronic device according to an embodiment of the present disclosure.

Referring to FIG. 4, the electronic device 100 may include a bus 110, a processor 120, a memory 130, an input/output interface 140, a display 150, a communication circuit 160 and a sensor module 170. For example, the electronic device 100 may be mounted in a space that is previously formed in the head-mounted display 1000 illustrated in FIGS. 1A to 1D or the head-mounted device 200 illustrated in FIG. 2 and may be electrically connected with the head-mounted device 200. According to a specific embodiment, the electronic device 100 may be included in a part of elements of the head-mounted display 1000 illustrated in FIG. 1.

The bus 110 may connect elements (e.g., the memory 130, the input/output interface 140, the display 150, the communication circuit 160, the sensor module 170, and the like) included in the electronic device 100 with each other and may correspond to a circuit conveying communications (e.g., control messages) among elements.

The processor 120 may receive, for example, a command from the above-described other elements (e.g., the memory 130, the input/output interface 140, the display 150, the communication circuit 160, the sensor module 170, and the like) through the bus 110, may decode the received command, and may perform an arithmetic operation or a data processing based on the decoded command.

According to an embodiment of the present disclosure, the processor 120 may generate binocular image data based on virtual reality content 131 stored in the memory 130. The binocular image data may be outputted and played back in the display 150, and thus a user may receive a stereoscopic image. The head-mounted display 1000 in which the electronic device 100 is included may be mounted on the head of a user, and the display 150 of the electronic device 100 may be placed within a distance that is adjacent from both eyes of a user. Accordingly, after generating left-eye image data about the left-eye of a user and right-eye image data about the right-eye of the user, the processor 120 may perform an inverse distortion processing for compensating a lens distortion, and thus the processor 120 may generate the binocular image data.

Furthermore, to share an image with the external device 2000 (e.g., the head-mounted display 2000a, or the electronic device 2000b), the processor 120 may transmit data associated with the virtual reality content to the external device 2000 through the communication circuit 160.

According to an embodiment of the present disclosure, to share an image with the external device 2000, the processor 120 may determine whether the same virtual reality content as content stored in the electronic device 100 is stored in the external device. The processor 120 may be configured to determine data to be transmitted to (or shared with) the external device 2000 based on the determination result.

For example, if determining that the virtual reality content is stored in the external device 2000, the processor 120 may be configured to determine data associated with playback of binocular image data as data to be transmitted to the external device 2000. The data associated with playback may include location data in cyberspace according to a playback time of the binocular image data, field of view (FoV) data of a user who is in the cyberspace, sound data, screen brightness data, and the like. A FoV may be also referred to as a range of vision, a field of vision, an angle of view, or the like. The FoV may be configured to consider a direction of a screen that the user watches.

Because the same content as the virtual reality content 131 in the memory 130 of the electronic device 100 is stored in the external device 2000, the binocular image data may not be included in data associated with playback to be transmitted to the external device 2000. That is, the external device 2000 may generate and output image data corresponding to binocular image data outputted from the electronic device 100 based on virtual reality content previously stored in the external device 2000 and data associated with playback received from the electronic device 100.

For example, in the case where the external device 2000 corresponds to a head-mounted display (i.e., 2000a of FIG. 1A), a user of the external device 2000 may receive a stereoscopic image corresponding to a stereoscopic image that a user of the electronic device 100 receives. On the other hand, in the case where the external device 2000 corresponds to a general electronic device (i.e., 2000b of FIG. 1B), a user of the external device 2000 may receive a mono image corresponding to a stereoscopic image that a user of the electronic device 100 receives.

According to various embodiments of the present disclosure, the processor 120 may be configured to apply user sensing data obtained from the electronic device 100 or the head-mounted device 200 to the data associated with playback. For example, in the data associated with playback, the FoV that a user of the electronic device 100 watches at a location in cyberspace according to a specific playback time may be determined based on head motion sensing information (or head tracking data) of the user.

The user sensing data may be applied to the data associated with playback and may be used in an image playback of the electronic device 100. The data associated with playback may be transmitted to the external device 2000. Accordingly, an image played back in the electronic device 100 and the external device 2000 may correspond to an image applied to user sensing data obtained from a user of the electronic device 100.

According to various embodiments of the present disclosure, the data associated with playback may be streamed to the external device 2000 in real time and may be stored in a computer-readable recording medium (e.g., external memory). Accordingly, the data associated with playback may be provided to the external device 2000. In the case where the data associated with playback is streamed to the external device 2000 in real time, the external device 2000 may play back (or share) an image based on a timing that is synchronized with the electronic device 100.

Meanwhile, if the processor 120 determines that the virtual reality content is not stored in the external device 2000, the processor 120 may be configured to determine image data (e.g., binocular image data or mono image data) based on the virtual reality content as data to be transmitted to the external device 2000. As the virtual reality content is not stored in the external device 2000, the external device 2000 may not generate images only using the data associated with playback.

According to an embodiment of the present disclosure, in the case where the processor 120 determines that the virtual reality content is not stored in the external device 2000, the processor 120 may further determine whether the external device 2000 is connected to a head-mounted device. That is, the processor 120 may additionally determine whether the external device 2000 corresponds to a head-mounted display or whether the external device 2000 corresponds to a general electronic device (e.g., smartphone). The processor 120 may differently determine a type of image data to be transmitted to the external device 2000 based on whether the external device 2000 is connected with a head-mounted device.

For example, if the external device 2000 is determined as being connected to a head-mounted device (i.e., 2000*a* of FIG. 1C), the processor 120 may be configured to determine binocular image data outputted from the electronic device 100 as image data to be transmitted to the external device 2000. The external device 2000 may output binocular image data received from the electronic device 100 through an embedded display, and thus the external device 2000 may provide the same image as that of the electronic device 100 to a user of the external device 2000. According to an embodiment, if user sensing data is applied to a binocular image received from the electronic device 100, a user of the external device 2000 may receive an image, to which the user sensing data is applied, of the electronic device 100.

On the other hand, if the external device 2000 is determined as not being connected to a head-mounted device (i.e., 2000*b* of FIG. 1D), the processor 120 may be configured to generate mono image data corresponding to binocular image data that is played back in the electronic device 100 and determines the mono image data as image data to be transmitted to the external device 2000. The external device 2000 may output the mono image data received from the electronic device 100 through a display included in the external device 2000, and thus the external device 2000 may provide the mono image corresponding to the binocular image to a user of the external device 2000. Likewise, according to an embodiment, if user sensing data is applied to the mono image received from the electronic device 100, a user of the external device 2000 may receive an image, to which the user sensing data is applied, of the electronic device 100.

According to various embodiments of the present disclosure, image data (e.g., binocular image data and mono image data) to be transmitted to the external device 2000 may be streamed in real time and may be stored in a computer-readable recording medium. Accordingly the image data may be provided to the external device 2000. In the case where the image data is streamed to the external device 2000 in real time, the external device 2000 may play back (or share) an image based on a timing that is synchronized with the electronic device 100 of a user.

According to some embodiments of the present disclosure, the processor 120 may be configured to transmit image data to the external device 2000 whenever there is a change value greater than or equal to a specific value in the image of a previous frame by determining the image data every frame. As such, it in the case where an excessive buffering or low data throughput occurs due to the poor-quality of a network 162, the processor 120 may properly deal therewith.

The memory 130 may store a command or data that is received from the processor 120 or other elements (e.g., the input/output interface 140, the display 150, the communication interface 160, the sensor module 170, and the like) or is generated by the processor 120 or other elements. For example, the memory 130 may store the above-described virtual reality content 131. According to a specific embodiment, the memory 130 may include an external memory, and the above-described data associated with playback may be stored in the external memory.

The input/output interface 140 may be connected with the head-mounted device 200 and may transmit and receive various commands or data. For example, the input/output interface 140 may include the connector 204 of FIG. 2 and/or the USB module 321 of FIG. 3. For example, various commands or data transmitted and received through the input/output interface 140 may be transmitted to the processor 120, the memory 130, and the like through the bus 110.

For example, a user input received from the input unit 206 (or input device 340) of the head-mounted device 200 may be provided to the processor 120 through the input/output interface 140. Moreover, for example, audio data processed by the processor 120 may be provided to an audio module (not shown) of the head-mounted device 200 through the input/output interface 140.

The display 150 may display a variety of information (e.g., multimedia data, text data, or the like) to a user under control of the processor 120. For example, in the case where the electronic device 100 operates while connected with the head-mounted device 200, binocular image data may be outputted to the display 150.

According to an embodiment of the present disclosure, the electronic device 100 may be divided from the head-mounted device 200 and may be independently driven (i.e., stand-alone). In this case, mono image data may be outputted to the display 150.

The communication circuit 160 may establish a communication connection between the electronic device 100 and an external device 2000. For example, the communication circuit 160 may be connected to a network 162 through wireless communication or wired communication to communicate with the external device. The electronic device 100 may transmit data associated with playback or image data (e.g., binocular image data or mono image data) to the external device through the communication circuit 160.

The wireless communication may include at least one of, for example, a Wi-Fi, a Bluetooth, an NFC, a GPS, or a cellular communication (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like). The wired communication may include at least one of, for example, a USB, a high definition multimedia interface (HDMI), a recommended standard-232 (RS232), or a plain old telephone service (POTS).

According to an embodiment of the present disclosure, the network 162 may be a telecommunications network. The telecommunications network may include at least one of a computer network, an internet, an internet of things, or a telephone network.

According to an embodiment of the present disclosure, additionally or alternatively, the electronic device 100 may utilize the communication circuit 320 of the head-mounted device 200 through the input/output interface 140. Moreover, according to another embodiment, the communication circuit 160 may communicate with the communication circuit 320 of the head-mounted device 200.

The sensor module 170 may measure a physical quantity and may change the measured information into an electrical signal. For example, the sensor module 170 may detect the motion of a user, generating user sensing data. The user sensing data may include at least one of head tracking data of a user, motion data of an object in cyberspace of virtual reality content, motion data of a user, and eye track data of a user.

The sensor module 170 may be configured the same as or similar to the sensor module 330 of the head-mounted device 200 illustrated in FIG. 3. For example, the sensor module 170 may include at least one of an acceleration sensor, a gyro sensor, a geomagnetic sensor, a magnetic sensor, a proximity sensor, a gesture sensor, a grip sensor, or a biometric sensor.

For example, an acceleration sensor, a gyro sensor, and/or a geomagnetic sensor that is included in the sensor module 170 may detect the motion of a user and may generate head tracking data and/or motion data of object (e.g., a user in cyberspace) in cyberspace based on the detected result. Moreover, a gesture sensor included in the sensor module 170 may detect the motion of a part (e.g., hand or finger) of the body of a user, generating motion data of a user.

According to an embodiment of the present disclosure, additionally or alternatively, the user sensing data may be obtained from the sensor module 330 of the head-mounted device 200 through the input/output interface 140 as well as the sensor module 170 embedded in the electronic device 100.

Meanwhile, the electronic device 100 according to an embodiment of the present disclosure may be included in the external device 2000. For example, the external device 2000a of FIGS. 1A to 1D may include an element corresponding to (e.g., being equal to) each element of the electronic device 100 as a part of the external device 2000a.

In the case where the electronic device 100 is included in the external device 2000, the processor 120 may receive data associated with playback (e.g., data associated with playback of image data based on virtual reality content) or image data through the communication circuit 160.

In the case where the processor 120 receives the data associated with playback, the processor 120 may generate image data (e.g., binocular image data or mono image data) based on the virtual reality content 131 stored in the memory 130 and the received data associated with playback and may output the generated image data to the display 150.

According to an embodiment of the present disclosure, the processor 120 may apply user sensing data obtained from the sensor module 170 to data associated with playback received from an external device.

On the other hand, in the case where the processor 120 receives image data, the processor 120 may output and play back the image data to the display 150. For example, in the case where the processor 120 receives binocular image data, the processor 120 may output and play back the received binocular image data to the display 150. Moreover, in the case where the processor 120 receives mono image data, the processor 120 may output and play back the received mono image data to the display 150.

Figure 5:
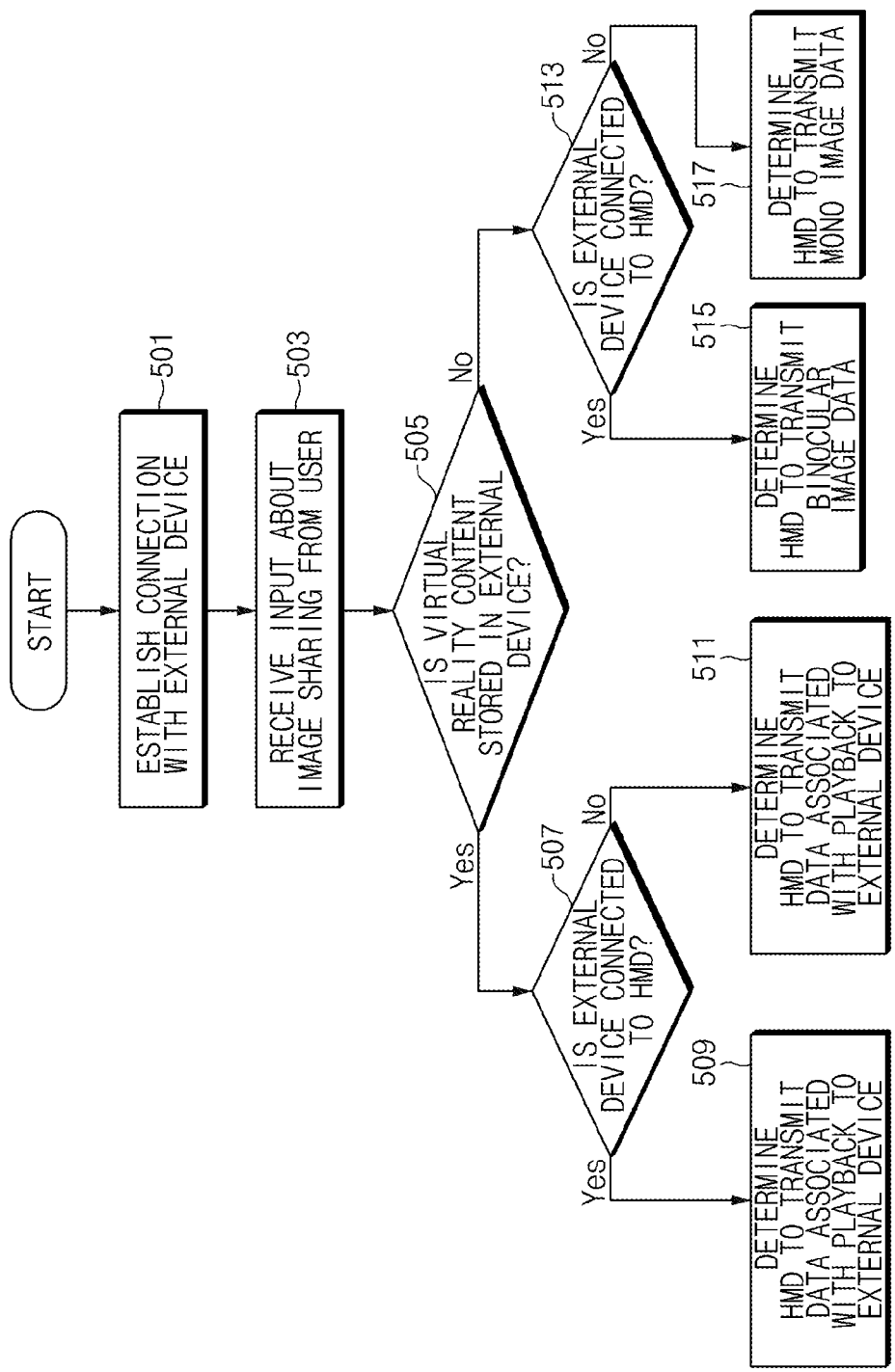
FIG. 5 is a flowchart illustrating an image sharing method according to an embodiment of the present disclosure.

FIG. 5 is a flowchart illustrating an image sharing method according to an embodiment of the present disclosure.

Referring to FIG. 5, the image sharing method according to an embodiment of the present disclosure may include operation 501 to operation 517. The image sharing method according to an embodiment may be performed by the head-mounted display 1000 (included in the electronic device 100) of FIGS. 1A to 1D. Moreover, the image sharing method according to an embodiment of the present disclosure may be performed in parallel with the output of binocular image data in the head-mounted display 1000.

In operation 501, the head-mounted display 1000 (of the electronic device 100) may establish a communication connection with the external device 2000.

According to an embodiment of the present disclosure, the communication connection may correspond to a connection based on a wired and wireless communication. For example, in the case of the use of a local area network, the head-mounted display 1000 may search for the external device 2000 adjacent to the head-mounted display 1000. The head-mounted display 1000 may establish a connection with the found external device 2000 based on a wireless protocol: Bluetooth, Wi-Fi, ZIGBEE, Z-WAVE, or the like.

For example, the head-mounted display 1000 may pair with the external device 2000 based on a Bluetooth module. The external device 2000 may transmit a pairing request message to the head-mounted display 1000 and the head-mounted display 1000 may transmit a pairing accept response message to the external device 2000, and thus the pairing may be made.

According to an embodiment of the present disclosure, the head-mounted display 1000 may establish a connection with the found external device 2000 based on whether there is a history that the head-mounted display 1000 performs an image sharing method or whether the found external device 2000 is a device registered in a device list of the head-mounted display 1000.

In operation 503, the head-mounted display 1000 may receive, from a user, an input about whether the image sharing method according to various embodiments of the present disclosure is performed. According to a specific embodiment, the input about whether the image sharing method is performed may be received through a tagging operation based on an NFC tag.

In operation 505, the head-mounted display 1000 may determine whether the same virtual reality content as virtual reality content stored in the head-mounted display 1000 is stored in the external device 2000. For example, the head-mounted display 1000 may transmit a content confirmation request message to the external device 2000 and the head-mounted display 1000 may receive a content confirmation response message from the external device 2000 in response thereto, and thus the determination about whether the virtual reality content is stored in the external device 2000 may be made. If the head-mounted display 1000 determines that the virtual reality content is stored in the external device 2000 based on the content confirmation response message, the procedure may proceed to operation 507. Otherwise, the procedure may proceed to operation 513.

In operation 507, the head-mounted display 1000 may determine whether the external device 2000 is a head-mounted display (or the external device 2000 is connected to a head-mounted device). The device confirmation request message and the response message thereof may be transmitted and received, and thus the determination of operation 507 may be made. If the external device 2000 is a head-mounted display (or the external device 2000 is connected to a head-mounted device), the procedure may proceed to operation 509. Otherwise, the procedure may proceed to operation 511.

According to an embodiment of the present disclosure, the determination according to operation 507 may be previously made when the connection with an external device is established in operation 501. For example, in the case where the head-mounted display 1000 is connected with the external device 2000 through a Bluetooth, device identification information may be included in the pairing request message in operation 501, and the pairing request message may be transmitted to the external device 2000. For example, the device identification information may be allocated in one bit of a universally unique identifier (UUID), which has 128 bytes, in the pairing request message. If the one bit of UUID is '1', this may mean that the external device 2000 corresponds to a head-mounted display (or external device 2000 is connected to a head-mounted device). If the one bit of UUID is '0', this may mean that the external device 2000 does not correspond to a head-mounted display.

In operation 509, the head-mounted display 1000 may determine that the same virtual reality content is stored in the external device 2000 and that the external device 2000 corresponds to a head-mounted display (or the external device 2000 is connected to a head-mounted device). Accordingly, the head-mounted display 1000 may determine the head-mounted display 1000 to transmit the data associated with playback of binocular image data to the external device 2000 (in the case of FIG. 1A).

According to an embodiment of the present disclosure, the data associated with playback may include a playback time (i.e., playback timing), location data in cyberspace according to a playback time, and FoV data of the user who is in the cyberspace. The external device 2000 may provide a stereoscopic image to a corresponding user based on the data associated with playback and virtual reality content previously stored.

According to an embodiment of the present disclosure, user sensing data of a user of the head-mounted display 1000 may be synchronized with and applied to the data associated with playback. Accordingly, the external device 2000 may provide a stereoscopic image to which the user sensing data of a user of the head-mounted display 1000 is reflected. In other words, the external device 2000 may provide the same image to user as that of the head-mounted display 1000.

According to another embodiment of the present disclosure, the external device 2000 may apply the user sensing data of the external device 2000 to data associated with playback received from the head-mounted display 1000. As such, the external device 2000 may provide an image different from that of the head-mounted display 1000. In other words, the external device 2000 may provide a stereoscopic image different from that of the head-mounted display 1000 in the same cyberspace as that of the head-mounted display 1000 at the same timing.

In operation 511, the head-mounted display 1000 may determine that the same virtual reality content is stored in the external device 2000 and that the external device 2000 does not correspond to a head-mounted display (or the external device 2000 is connected to a head-mounted device). Accordingly, the head-mounted display 1000 may determine the head-mounted display 1000 to transmit the data associated with playback of mono image data to the external device 2000. The external device 2000 may generate mono image data based on data associated with playback received from the head-mounted display 1000 and virtual reality content previously stored in the external device 2000 (in the case of FIG. 1B).

According to an embodiment of the present disclosure, user sensing data of a user of the head-mounted display 1000 may be synchronized with and applied to the data associated with playback. Accordingly, the external device 2000 may provide a mono image to which the user sensing data of a user of the head-mounted display 1000 is applied. In other words, the external device 2000 may provide a corresponding to user with a mono image corresponding to a stereoscopic image outputted from the head-mounted display 1000.

According to an embodiment of the present disclosure, the external device 2000 may apply the user sensing data of the external device 2000 to data associated with playback received from the head-mounted display 1000. As such, the external device 2000 may provide an image different from that of a user of the head-mounted display 1000. In other words, the external device 2000 may provide a mono image different from that of the head-mounted display 1000 in the same cyberspace as that of the head-mounted display 1000 at the same timing.

In operation 513, the head-mounted display 1000 may determine whether the external device 2000 is a head-mounted display (or the external device 2000 is connected to a head-mounted device). The determination of operation 513 may correspond to the determination of operation 507. If the external device 2000 is a head-mounted display (or the external device 2000 is connected to a head-mounted device), the procedure may proceed to operation 515. Otherwise, the procedure may proceed to operation 517.

In operation 515, the head-mounted display 1000 may determine that the same virtual reality content is not stored in the external device 2000 and that the external device 2000 corresponds to a head-mounted display (or the external device 2000 is connected to a head-mounted device). Accordingly, the head-mounted display 1000 may determine the head-mounted display 1000 to transmit binocular image data to the external device 2000 (in the case of FIG. 1C). Accordingly, the external device 2000 may provide the binocular image data to which the user sensing data of the head-mounted display 1000 is applied. That is, a user of the external device 2000 may receive the same stereoscopic image as that of a user of the head-mounted display 1000. Meanwhile, according to an embodiment, the binocular image data may be transmitted to the external device 2000 based on a streaming method.

In operation 517, the head-mounted display 1000 may determine that the same virtual reality content is not stored in the external device 2000 and that the external device 2000 corresponds to a head-mounted display (or the external device 2000 is connected to a head-mounted device). Accordingly, the head-mounted display 1000 may determine the head-mounted display 1000 to generate mono image data corresponding to binocular image data outputted from the head-mounted display 1000 and, to transmit the mono image data to the external device 2000 (in the case of FIG. 1D). The external device 2000 may output mono image data to which user sensing data of the head-mounted display 1000 is applied. That is, a user of the external device 2000 may receive a mono image corresponding to a stereoscopic image that a user of the head-mounted display 1000 receives.

According to various image sharing methods of the present disclosure, the head-mounted display 1000 may determine data associated with an image to be shared based on whether the external device 2000 stores the same virtual reality content and/or based on a type of the external device 2000.

For example, if storing the same content as virtual reality content stored in the head-mounted display 1000, the external device 2000 may transmit not image data but data associated with playback. Accordingly, data traffic between both the head-mounted display 1000 and the external device 2000 may be minimized.

Moreover, even though the external device 2000 does not store the virtual reality content, there is an advantage that the external device 2000 transmits optimal image data based on a type of the external device 2000. Moreover, the transmitted image data may be streamed thereto, thereby previously protecting content from being illegally copied.

Figure 6:
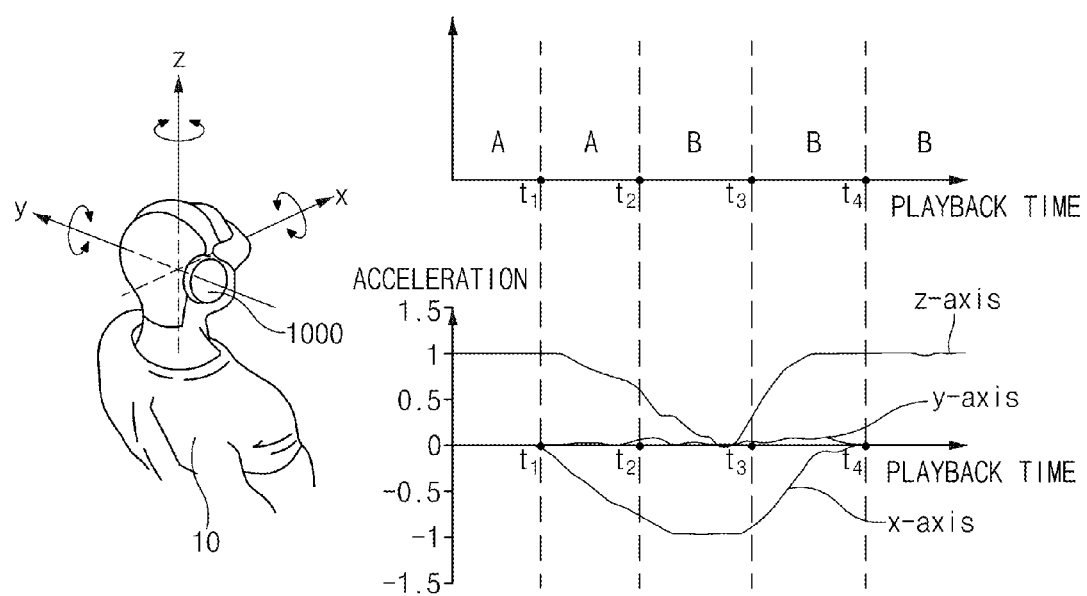
FIG. 6 is a diagram for describing user sensing data according to an embodiment of the present disclosure.

FIG. 6 is a diagram for describing user sensing data according to an embodiment of the present disclosure.

Referring to FIG. 6, a user 10 may wear the head-mounted display 1000 (i.e., including the electronic device 100 and the head-mounted device 200) while watching a stereoscopic image based on virtual reality content. Meanwhile, binocular image data may be outputted to the display 150 of the electronic device 100 embedded in the head-mounted display 1000. The sensor module 330 of the head-mounted device 200 may detect the motion of the head, generating head tracking data (user sensing data). For example, the head tracking data may include acceleration information about the head of a user.

Referring to the bottom right graph of FIG. 6, the sensor module 170 and/or 330 may detect an acceleration of each of x-axis, y-axis, and z-axis directions of the head of the user 10. The detected acceleration information (i.e., head tracking data) may synchronize with a playback time of an image according to virtual reality content and location data in cyberspace according to the playback time (refer to the top right graph of FIG. 6). That is, the user sensing data may be applied to information associated with playback, affecting the providing of an image based on virtual reality content.

For example, as illustrated at the top right graph of FIG. 6, the user 10 may be placed at location A in cyberspace at time t1. If moving the head of the user 10 during time t1 to time t2, the user 10 may watch an image (i.e., stereoscopic image) changed according to the motion of the head, at location A in the cyberspace. That is, an acceleration change based on the motion of the head of the user 10 may affect an FoV of a user in cyberspace. Accordingly an image provided to a user may be changed according to the change of the FoV.

Meanwhile, if a playback time reaches time t2, another scene may be provided to a user. For example, location A in cyberspace may be changed into location B. Afterwards, the user 10 may receive an image changed according to the motion of the head of the user 10 in cyberspace of location B.

The head tracking data is an example of user sensing data, and the user sensing data may include motion data of an object (e.g., the user 10 in cyberspace) in cyberspace, motion data of the user 10, eye track data of the user 10, and the like.

For example, the motion data of an object in the cyberspace may be obtained by the movement according to walking of a user, the manipulation of an input device (e.g., a user input about the input unit 206 of the head-mounted device 200 of FIG. 2 or a user input based on an external console), or the like. Moreover, the motion data of the user 10 may be obtained by a camera or a gesture sensor, and the eye track data may be obtained by the eye tracker.

Moreover, the head tracking data may be precisely obtained based on data obtained from a gyro sensor, a geomagnetic sensor, and the like as well as an acceleration sensor. As such, various user sensing data may be applied to data associated with playback and may affect a stereoscopic image provided to a user.

Figure 7:
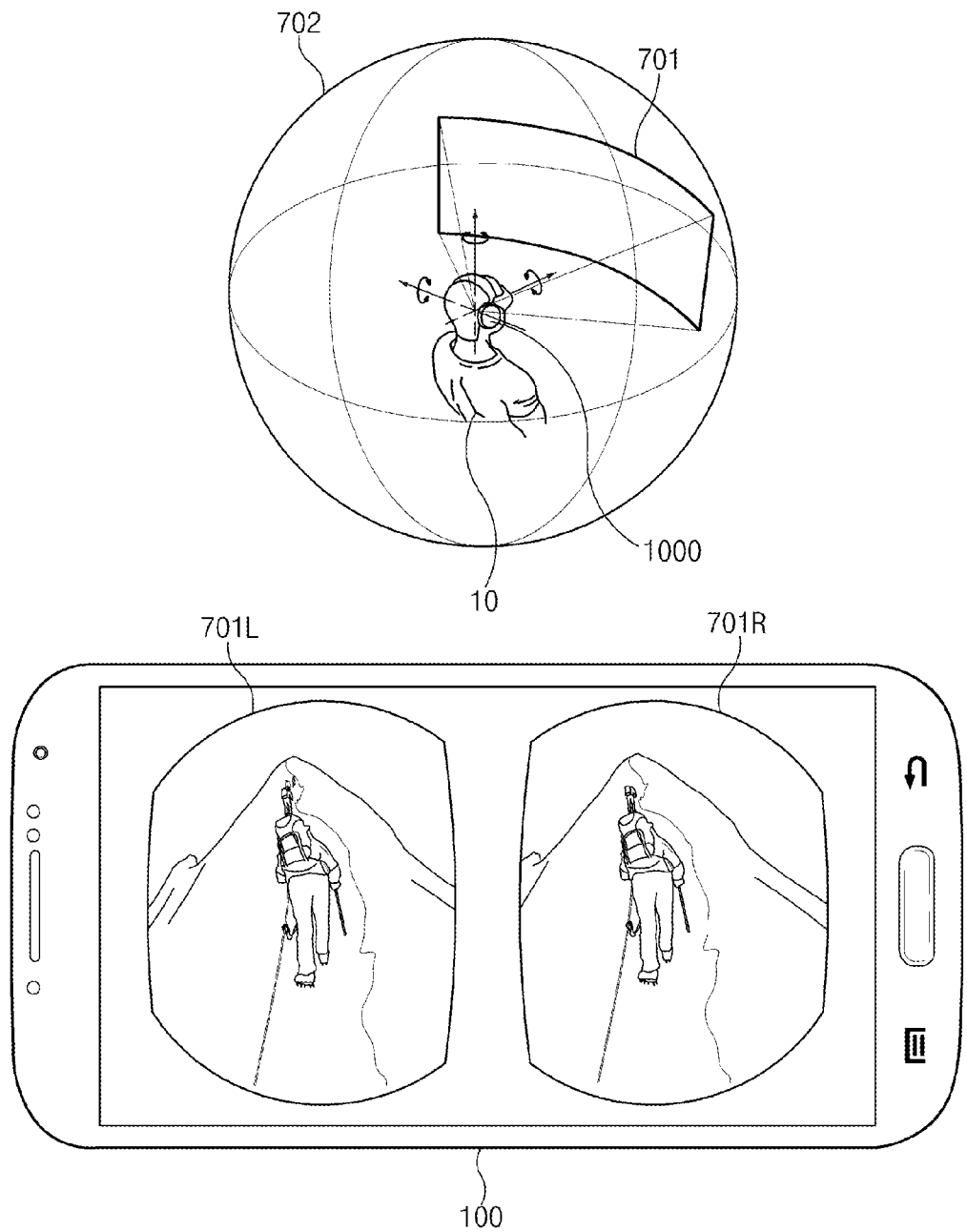
FIG. 7 is a diagram illustrating an example to which a stereoscopic image according to an embodiment of the present disclosure.

FIG. 7 is a diagram illustrating an example to which a stereoscopic image is provided according to an embodiment of the present disclosure.

Referring to FIG. 7, the user 10 wearing the head-mounted display 1000 (including the electronic device 100 and the head-mounted device 200) may watch a stereoscopic image 701 according to a specific FoV in cyberspace 702. The back appearance of one mountaineer that climbs a mountain may be included in the stereoscopic image 701. At this time, the left-eye image screen 701L and the right-eye image screen 701R based on binocular image data may be displayed in the display 150 of the electronic device 100 included in the head-mounted display 1000.

According to an embodiment of the present disclosure, as described in FIG. 6, the FoV in the cyberspace 702 or a location in the cyberspace 702 may be changed according to motion (e.g., rotation of a head, movement according to walking) of the body of the user 10. The user 10 may receive a stereoscopic image changed according to the change of the FoV and the location.

For example, an image that the user 10 receives may correspond to an image in cyberspace changed according to a playback time, and user sensing information of the user 10 may be applied to the FoV or the location in the cyberspace. Accordingly, the user 10 may receive an image changed according to the motion of the user 10 in the cyberspace. As such, a user may watch a realistic stereoscopic image according to the motion of the user.

Figure 8:
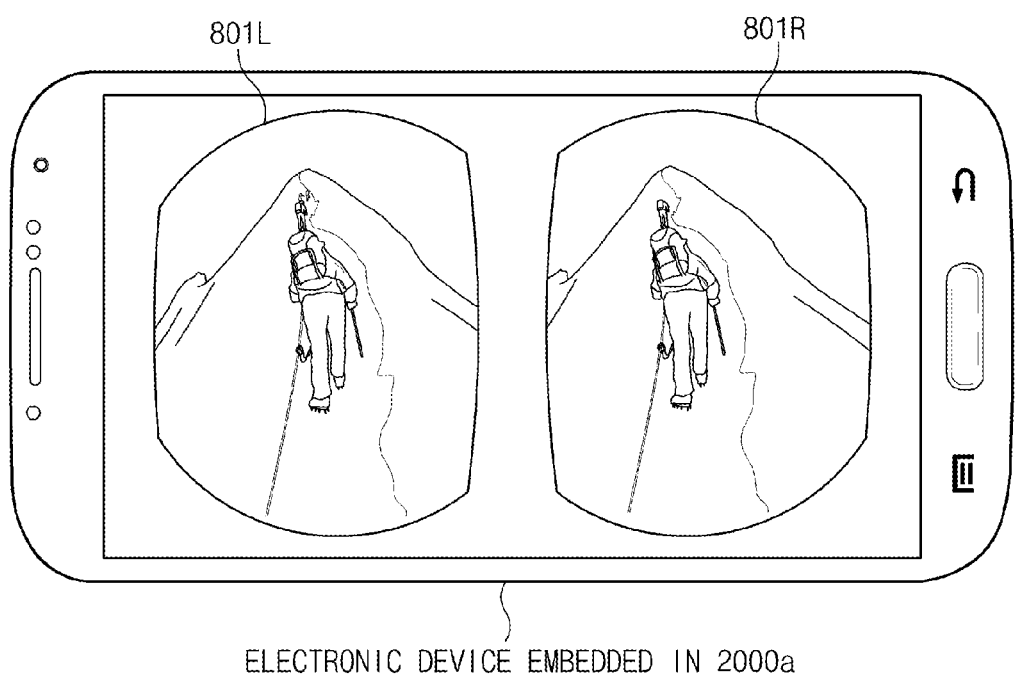
FIG. 8 is a diagram for describing an image outputted from an external device by an image sharing method according to an embodiment of the present disclosure.

FIG. 8 is a diagram for describing an image outputted from an external device by an image sharing method according to an embodiment of the present disclosure.

Referring to FIG. 8, an electronic device embedded in the head-mounted display 2000a (i.e., external device) is displayed. The electronic device embedded in the head-mounted display 2000a may provide a user with a stereoscopic image by displaying binocular image data. In the display of the electronic device embedded in the head-mounted display 2000a, a left-eye image screen 801L and a right-eye image screen 801R may be displayed based on the binocular image data.

For example, the binocular image data may be outputted from an external device in operation 509 or operation 515 of FIG. 5. In this case, the same screens as the left-eye image screen 801L and the right-eye image screen 801R of FIG. 8 may be displayed in the head-mounted display 1000 being a device that shares an image (see FIG. 7).

FIG. 9 is a diagram for describing a mono image outputted from an external device by an image sharing method according to an embodiment of the present disclosure.

Referring to FIG. 9, the electronic device 2000b (i.e., external device) that is not mounted in a head-mounted device (e.g., head-mounted device 200 of FIG. 2) and operates in a stand-alone state is displayed. The electronic device 2000b may provide a user with a mono image 901 by displaying mono image data on a display.

For example, the mono image 901 data may be outputted from an external device in operation 511 or operation 517 of FIG. 5. In this case, the stereoscopic image 701 based on the left-eye image screen 701L and the right-eye image screen 701R of FIG. 7 may be provided to the head-mounted display 1000 that shares an image (e.g., see FIG. 7). That is, the mono image 901 corresponding to the stereoscopic image 701 may be outputted to the electronic device 2000b being an external device.

Figure 10:
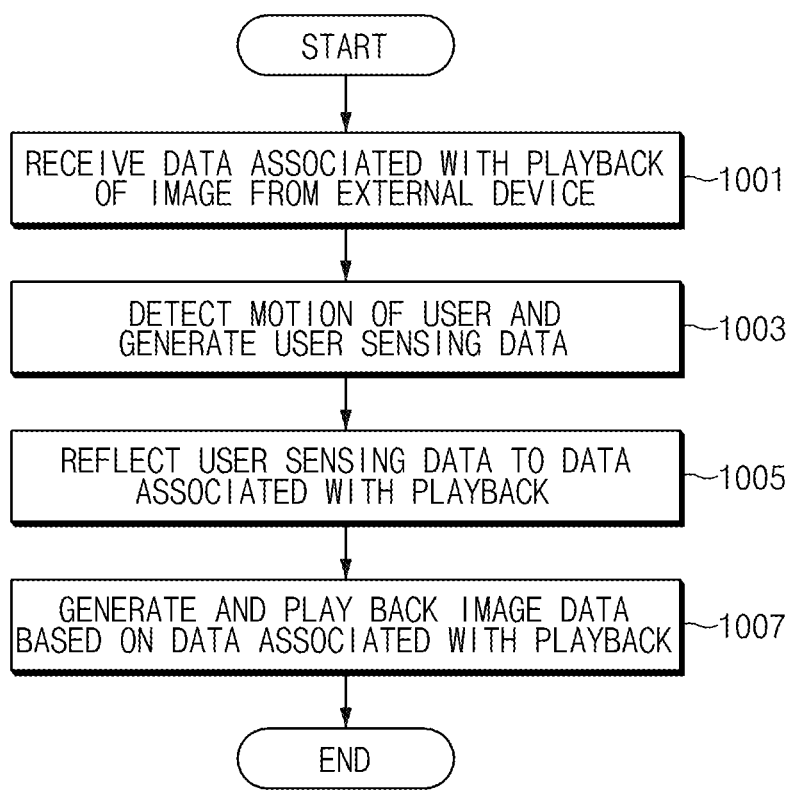
FIG. 10 is a flowchart illustrating an image providing method of an electronic device according to an embodiment of the present disclosure.

FIG. 10 is a flowchart illustrating an image providing method of an electronic device according to an embodiment of the present disclosure.

Referring to FIG. 10, the image providing method of the electronic device according to an embodiment of the present disclosure may include operation 1001 to operation 1007.

For example, the electronic device performing the image providing method illustrated in FIG. 10 may correspond to the head-mounted display 2000a (included in an electronic device) of FIG. 1A or the electronic device 2000b of FIG. 1B. Meanwhile, an external device of FIG. 10 may correspond to the head-mounted display 1000 of FIG. 1A or 1B.

Similarly, the electronic device of FIG. 10 may correspond to the external device 2000 in operation 509 or operation 511 of FIG. 5, and the external device of FIG. 10 may correspond to the head-mounted display 1000 that performs each operation of FIG. 5

In FIG. 10, a reference number may be given to be the same as the reference number of FIG. 5. Moreover, the electronic device of FIG. 10 may corresponding to the external device in operation 509 or operation 511 of FIG. 5 (i.e., 'Yes' in operation 505), and thus the same virtual reality content may be stored in both the electronic device 2000 and the external device 1000 of FIG. 10.

In operation 1001, the electronic device 2000 may receive data associated with playback of a stereoscopic image from external device 1000. As described above, the data associated with playback may include location data in cyberspace according to a playback time, FoV data about an image that a user watches in the cyberspace, sound data, screen brightness data, and the like.

In operation 1003, the electronic device 2000 may detect the motion of a user, generating user sensing data. As described above, the user sensing data may include at least one of head tracking data of a user, motion data of an object in cyberspace of virtual reality content, motion data of a user, or eye track data of a user.

In operation 1005, the electronic device 2000 may apply user sensing data of the electronic device 2000 to data associated with playback received from the external device 1000. That is, in the case where the electronic device 2000 generates an image based on virtual reality content, the electronic device 2000 may apply user sensing data of the electronic device 2000 to the virtual reality content. For example, the head tracking data may affect the FoV of a user in cyberspace.

In operation 1007, the electronic device 2000 may generate and output (or play back) image data based on the data associated with playback. For example, in the case where the electronic device 2000 corresponds to the head-mounted display 2000a, the generated image data may correspond to binocular image data (in the case of operation 509 of FIGS. 1A and 5). Meanwhile, in the case where the electronic device 2000 corresponds to the electronic device 2000b of a stand-alone state, the generated image data may correspond to mono image data (in the case of operation 511 of FIGS. 1B and 5).

Figure 11:
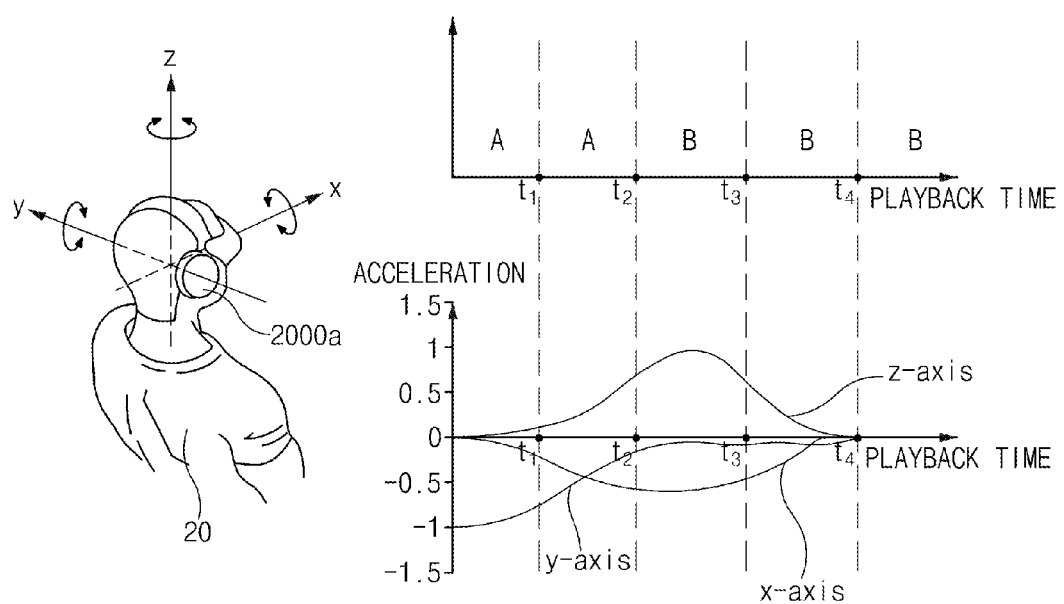
FIG. 11 is a diagram for describing that user sensing data is applied to data associated with playback in an electronic device according to an embodiment of the present disclosure.

FIG. 11 is a diagram for describing that user sensing data is applied to data associated with playback in an electronic device according to an embodiment of the present disclosure.

Referring to the left of FIG. 11, a user 20 that wears the head-mounted display 2000a is displayed. The head-mounted display 2000a may store the same virtual reality content as that of external device 1000, receiving data associated with playback from the external device 1000. That is, the head-mounted display 2000a may perform the image providing method of FIG. 10.

For example, the head-mounted display 2000a may detect the motion of the head of the user 20, generating head tracking data (user sensing data). For example, the head tracking data may include acceleration information about the head of the user 20.

Referring to the bottom right graph of FIG. 11, the head-mounted device 2000a may detect an acceleration of each of x-axis, y-axis, and z-axis directions of the head of the user 20. The detected acceleration information (i.e., head tracking data) may synchronize with data associated with playback received from the external device 1000 (i.e., location data in cyberspace according to the playback time) (refer to the top right graph of FIG. 11). That is, user sensing data of the user 20 may be applied to information associated with playback received from the external device 1000, affecting the providing of an image based on virtual reality content.

For example, as illustrated at the top right graph of FIG. 11, the user 20 may be placed at location A in cyberspace at time t1. If the user 20 rotates their head during time t1 to time t2, the user 20 may watch an image (i.e., stereoscopic image) changed according to the motion of the head, at location A in the cyberspace. That is, an acceleration change based on the motion of the head of the user 20 may affect the FoV of the user 20 in cyberspace. Accordingly an image provided to a user may be changed according to the change of the FoV.

Figure 12:
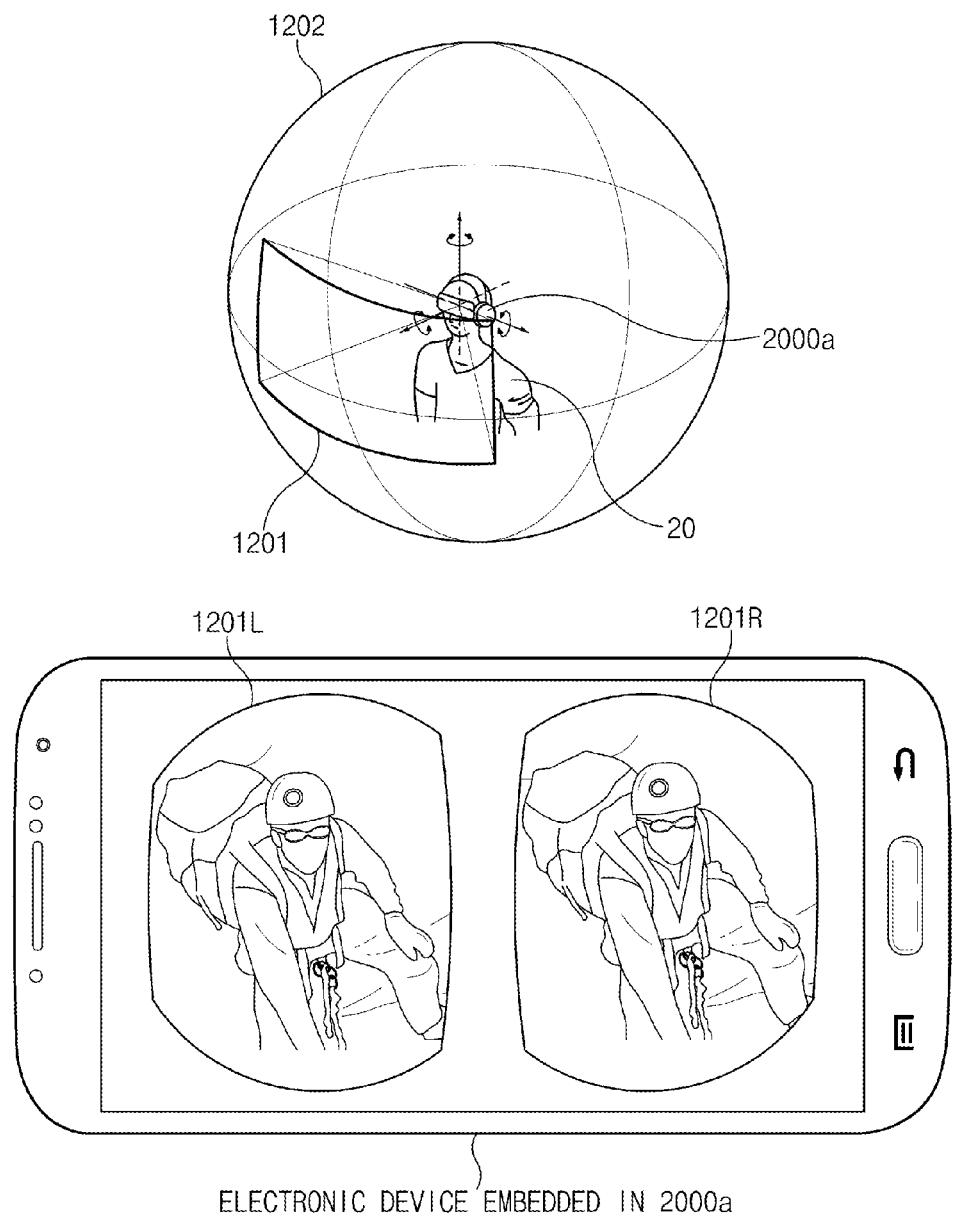
FIG. 12 is a diagram for describing playing back an image, to which user sensing data is applied in an electronic device according to an embodiment of the present disclosure.

FIG. 12 is a diagram for describing playing back an image to which user sensing data is applied in an electronic device according to an embodiment according to an embodiment of the present disclosure.

Referring to FIG. 12, the user 20 that wears the head-mounted display 2000a may watch a stereoscopic image 1201 based on a specific FoV in cyberspace 1202. The front appearance of one mountaineer that climbs a mountain may be included in the stereoscopic image 1201. At this time, a left-eye image 1201L and a right-eye image 1201R based on binocular image data may be displayed on a display of an electronic device in the head-mounted display 2000a.

According to an embodiment of the present disclosure, as described in FIG. 11, the FoV in the cyberspace 702 may be changed according to the rotation of the head of the user 20. For example, unlike the external device 1000 in which a stereoscopic image including the back appearance of one mountaineer that climbs a mountain is played back (see FIG. 7), in the case where the head of the user 20 rotates by 180 degrees at a specific time (e.g., time t1), another stereoscopic image (i.e., an image including the front appearance of another mountaineer that climbs a mountain) based on another FoV at location A in cyberspace may be played back.

In other words, an image that the user 20 receives may correspond to an image of which user sensing information of the user 20 is applied to data associated with playback received from the external device 1000. The user 20 may receive an image changed according to the motion of the user 20 in the cyberspace at the same timing as that of the external device 1000. Accordingly, the user and a user of the external device 1000 may receive a realistic stereoscopic image of virtual reality content based on the motion of the user at the same time. As such, the user 20 may prevent a cybersickness phenomenon occurring in the case where the user 20 watches an image corresponding to virtual reality data to which the motion of a user of an external device is applied (e.g., in the case of FIG. 8).

Figure 13:
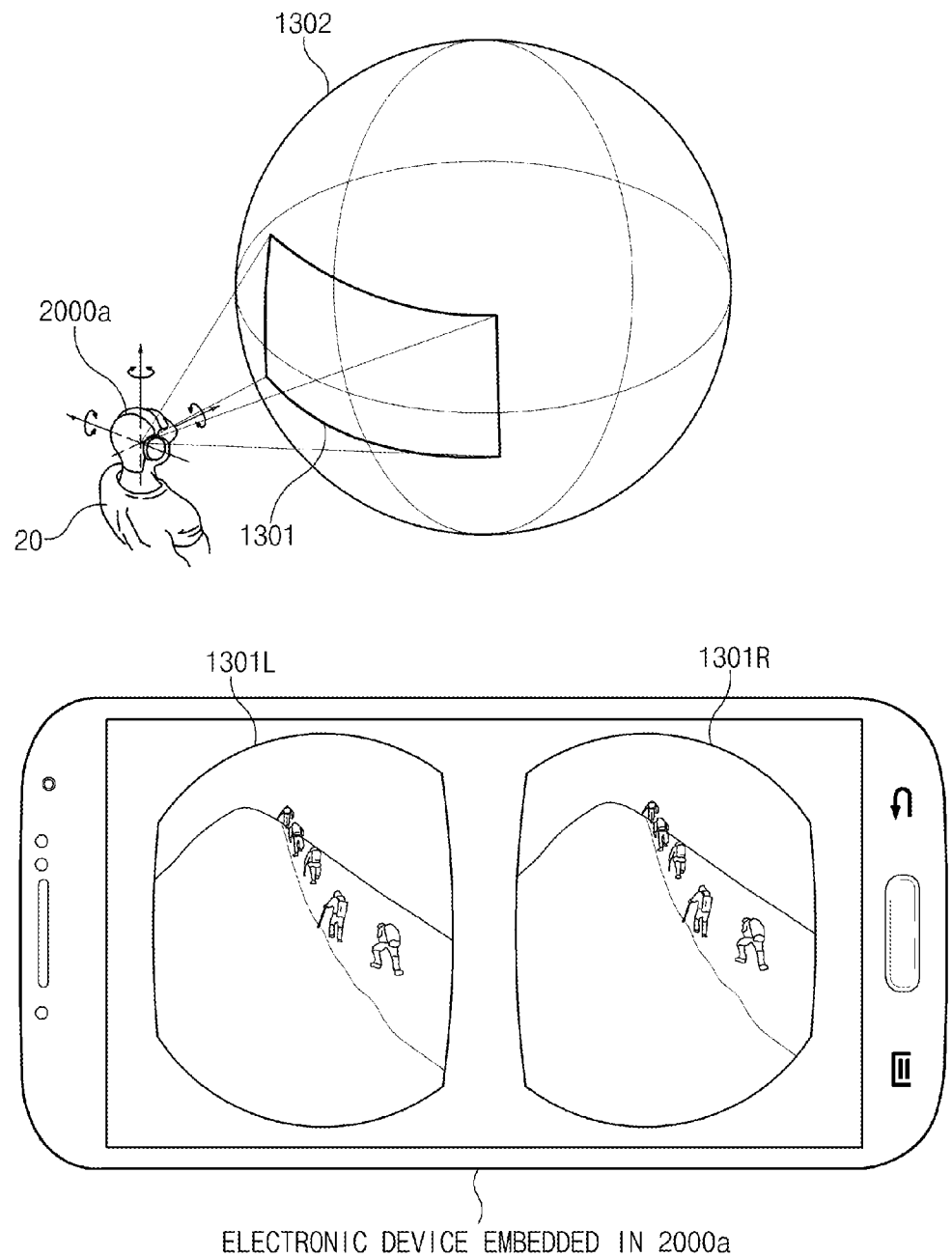
FIG. 13 is a diagram for describing playing back an image in a specific view point in an electronic device according to an embodiment of the present disclosure.

FIG. 13 is a diagram for describing playing back an image in a specific view point in an electronic device according to an embodiment of the present disclosure.

Referring to FIG. 13, the user 20 that wears the head-mounted display 2000a may watch a stereoscopic image 1301 according to a specific view point (or FoV), out of cyberspace 1302. An appearance in which several mountaineers climb a mountain may be displayed on the stereoscopic image 1301, in the third view point. At this time, a left-eye image 1301L and a right-eye image 1301R based on binocular image data may be displayed on a display of an electronic device included in the head-mounted display 2000a.

According to an embodiment of the present disclosure, one view point in which the user 20 views cyberspace may be the third view point, not a view point of a specific object (e.g., one mountaineer in the stereoscopic image 1301). The third view point may correspond to a view point (i.e., omniscient view point) in which anyone outside cyberspace views the cyberspace.

The stereoscopic image 1301 according to the third view point may be set based on motion data (i.e., user sensing information) detected according to walking of a user. For example, unlike the external device 1000 in which a stereoscopic image including the back appearance of one mountaineer that climbs a mountain is played back (see FIG. 7), in the case where the user 20 walks in a specific direction (e.g., the rear direction of the user 20) at a specific time, a stereoscopic image (i.e., an image including the appearance of several mountaineers that climb a mountain) in which the user 20 views the cyberspace 1302 in the third view point may be provided to the head-mounted display 2000a.

In other words, an image that the user 20 receives may correspond to an image of which user sensing information of the user 20 is applied to data associated with playback received from the external device 1000. The user 20 may receive an image changed according to the motion of the user 20 in the third view point at the same timing as that of the external device 1000. Accordingly, the user 20 may prevent a cybersickness phenomenon occurring in the case where the user 20 watches a stereoscopic image to which the motion of the user 20 of the external device 1000 is applied.

According to various embodiments of the present disclosure, the third view point may not be limited to the omniscient view point. For example, a new object may be generated in the cyberspace 1302, and a view point in which the object views the cyberspace 1302 may be set. As such, the user 20 of the head-mounted display 2000a may receive various user experiences based on virtual reality content.

Figure 14:
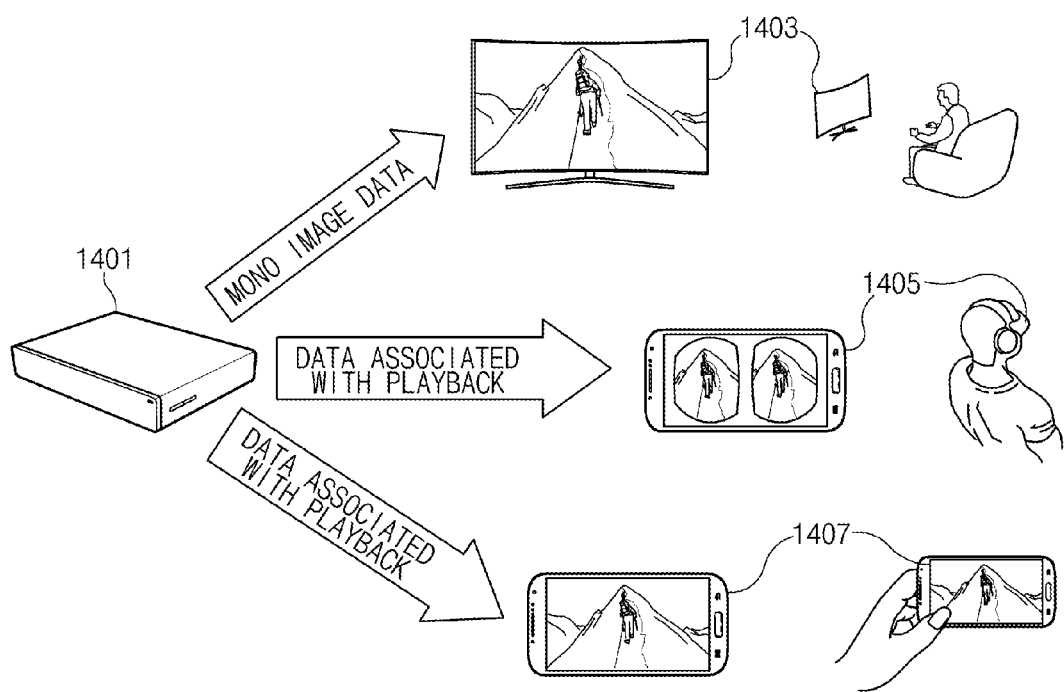
FIG. 14 is a diagram for describing that an electronic device performs a method of sharing an image with a plurality of electronic devices according to an embodiment of the present disclosure.

FIG. 14 is a diagram for describing that an electronic device according to an embodiment performs a method of sharing an image with a plurality of electronic devices.

Referring to FIG. 14, the electronic device according to various embodiments may be implemented with a TV box 1401 (e.g., Samsung HomeSync™ and the like). The TV box 1401 may include, for example, the processor 120, the memory 130, the input/output interface 140, the communication circuit 160, and the like in FIG. 2 and may perform an image sharing method according to various embodiments. According to an embodiment, the TV box 1401 may be supported functions corresponding to the sensor module 120 and the display 150 from an external device. Generally, the TV box 1401 included in a normal home may be variously used as a home hub, a smart home server.

The TV box 1401 may communicate with a smart TV 1403 including a large-sized display panel, a smartphone 1405 mounted in a head-mounted device, or a smartphone 1407 that independently operates (i.e., operates in stand-alone) by using wired or wireless method based on a specific protocol. The smart TV 1403, the smartphone 1405, or the smartphone 1407 (hereinafter referred to as "a smart TV 1403, and the like") may interact with the TV box 1401. Accordingly, the smart TV 1403 may provide various user interfaces (UIs) screen for an image sharing method to a user.

According to an embodiment of the present disclosure, the smart TV 1403, and the like may request TV box 1401 storing virtual reality content to share the virtual reality content through the various UI screen. TV box 1401 may determine whether the smart TV 1403, and the like respectively store the same virtual reality contents, and/or whether the smart TV 1403, and the like are connected to a head-mounted device, in response to the request. TV box 1401 may transmit image data or data associated with playback based on virtual reality content to the smart TV 1403, and the like based on the determination result.

For example, it is assumed that the smart TV 1403 does not store virtual reality content store in the TV box 1401 and the smartphones 1405 and 1407 store the virtual reality content.

In this case, the smart TV 1403 may not store the same virtual reality content and may not be connected to a head-mounted device. Accordingly, the TV box 1401 may transmit mono image data based on the virtual reality content to the smart TV 1403. Moreover, the smartphone 1405 may store the same virtual reality content and may be connected to a head-mounted device. Accordingly, the TV box 1401 may transmit data associated with playback of binocular image data based on the virtual reality content to the smart TV 1403. Moreover, the smartphone 1407 may not store the same virtual reality content and may not be connected to a head-mounted device. Accordingly, the TV box 1401 may transmit data associated with playback of mono image data based on the virtual reality content to the smart TV 1407.

In the case of a TV box according to an embodiment, users that use various electronic devices (e.g., smart TV, head-mounted display, smartphone, and the like) may share virtual reality content in the form suitable for each electronic device.

The term "module" used according to various embodiments of the present disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure may be, for example, implemented by instructions stored in a computer-readable storage media in the form of a programming module. The instruction, when executed by one or more processors (e.g., the processor 120 of FIG. 4), may cause the one or more processors to perform a function corresponding to the instruction. The computer-readable storage media, for example, may be the memory 130 of FIG. 4. At least a portion of the programming module may be implemented (e.g., executed), for example, by the processor 120. At least a portion of the programming module may include, for example, a module, a program, a routine, sets of instructions, or a process for performing one or more functions.

The computer-readable storage media may include a hard disk, a magnetic media (e.g., a floppy disk and a magnetic tape), an optical media (e.g., a compact disc read only memory (CD-ROM) and a DVD), a magneto-optical media (e.g., a floptical disk), and hardware devices (e.g., a ROM, a random access memory (RAM), or a flash memory) that are specially configured to store and perform program instructions (e.g., the programming module). Also, a program instruction may include not only a mechanical code such as things generated by a compiler but also a high-level language code executable on a computer using an interpreter. The above-mentioned hardware devices may be configured to operate as one or more software modules to perform operations according to various embodiments of the present disclosure, and vice versa.

Modules or programming modules according to various embodiments of the present disclosure may include at least one or more of the above-mentioned elements, some of the above-mentioned elements may be omitted, or other additional elements may be further included therein. Operations executed by modules, programming modules, or other elements may be executed by a successive method, a parallel method, a repeated method, or a heuristic method. Also, a part of operations may be executed in different sequences, omitted, or other operations may be added.

According to various embodiments of the present disclosure, in a storage media storing commands, when the commands is performed by at least one processor, the at least one processor is configured to perform at least one operation. the at least one operation may include determining whether the same virtual reality content is stored in an external device connected with an electronic device and determining data to be shared with an external device based on the determination result.

In various image sharing methods and an electronic device performing the methods, the electronic device may determine data associated with an image to be shared based on whether an external device stores the same virtual reality content and/or whether an external device is a head-mounted display.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for a head-mounted device (HMD), the electronic device comprising:
   a display;
   a memory configured to store virtual reality content;
   a sensor module;
   a communication circuit configured to communicate with an external device; and
   a processor configured to:
      play back binocular image data based on the virtual reality content on the display,
      control the sensor module to detect a motion of a user,
      apply user sensing data based on the detected result to data associated with playback of the binocular image data,
      determine whether the virtual reality content is stored in the external device,
      control the communication circuit to transmit the data associated with playback of the binocular image data and not to transmit image data based on the virtual reality content, when the processor determines that the virtual reality content is stored in the external device, and
      control the communication circuit to transmit the image data based on the virtual reality content corresponding to the binocular image data, when the processor determines that the virtual reality content is not stored in the external device,
   wherein the data associated with playback comprises location data in cyberspace according to a playback time of the binocular image data and field of view (FoV) data of the user in the cyberspace, and
   wherein the data associated with playback is used for applying the direction and angle of view of the screen viewed by the user to virtual reality content displayed by the external device.

2. The electronic device of claim 1, wherein the user sensing data comprises at least one of head tracking data of the user, motion data of an object in cyberspace of the virtual reality content, or motion data of the user.

3. The electronic device of claim 1, wherein the processor is further configured to allow the communication circuit to stream the image data based on the virtual reality content to the external device.

4. The electronic device of claim 1, wherein the processor is further configured to:
   further determine whether the external device is connected to the head-mounted device, and
   differently determine image data to be transmitted to the external device based on whether to be connected with the head-mounted device.

5. The electronic device of claim 4, wherein when the external device is determined as being connected to the head-mounted device, the processor is further configured to determine the played-back binocular image data as image data to be transmitted to the external device.

6. The electronic device of claim 4, wherein when the external device is determined as not being connected to the head-mounted device, the processor is further configured to generate mono image data corresponding to the played-back binocular image data and to determine the mono image data as the image data to be transmitted to the external device.

7. An image sharing method of an electronic device that plays back binocular image data based on virtual reality content, the method comprising:
   establishing a connection with an external device;
   detecting a motion of a user and generating user sensing data;
   applying user sensing data based on the detected result to data associated with playback of the binocular image data;
   determining whether the virtual reality content is stored in the external device;
   transmitting the data associated with playback of the binocular image data, when the processor determines that the virtual reality content is stored in the external device without transmitting image data based on the virtual reality content; and
   transmitting the image data based on the virtual reality content corresponding to the binocular image data, when the processor determines that the virtual reality content is not stored in the external device,
   wherein the data associated with playback comprises location data in cyberspace according to a playback time of the binocular image data and field of view (FoV) data of the user in the cyberspace, and wherein the data associated with playback is used for applying the direction and angle of view of the screen viewed by the user to virtual reality content displayed by the external device.

8. The method of claim 7, wherein the image data based on the virtual reality content is streamed and shared.

9. The method of claim 7, wherein the determining of whether the virtual reality content is stored in the external device further comprises determining whether the external device is connected to a head-mounted device, and wherein the determining of the data comprises differently determining image data to be shared with the external device based on whether the external device is connected to the head-mounted device.

10. The method of claim 9, wherein when the external device is determined as being connected to the head-mounted device, the determining of the data comprises:

determining the binocular image data as image data to be shared with the external device.

11. The method of claim 9, wherein when the external device is determined as not being connected to the head-mounted device, the determining of the data comprises:

generating mono image data corresponding to the binocular image data; and determining the mono image data as image data to be shared with the external device.

\* \* \* \* \*